United States Patent [19]

Boretzky et al.

[11] Patent Number: 5,250,650
[45] Date of Patent: Oct. 5, 1993

[54] CHIP RESISTANT POLYURETHANE COATING

[75] Inventors: Leon N. Boretzky, Wexford; Kurt E. Best, Pittsburgh; David C. McClurg, Carnegie; Angela I. Wallace, Aliquippa, all of Pa.

[73] Assignee: Miles Inc., Pittsburgh, Pa.

[21] Appl. No.: 858,822

[22] Filed: Mar. 27, 1992

[51] Int. Cl.⁵ ............................................. C08G 18/70
[52] U.S. Cl. .................................... 528/67; 528/59; 528/61; 528/64; 528/65
[58] Field of Search ................. 528/67, 59, 61, 64, 528/65

[56] References Cited

U.S. PATENT DOCUMENTS 5,079,325 1/1992 Kano et al. ........................ 528/45

Primary Examiner—Morton Foelak
Assistant Examiner—Duc Truong
Attorney, Agent, or Firm—Joseph C. Gil; Lyndanne M. Whalen

[57] ABSTRACT

A polyurethane coating which is chip resistant and resistant to chemical decontamination treatments which is made by reacting one component made up of isocyanate-reactive materials and a second isocyanate component. The first component includes an aromatic polyamine (preferably an aromatic diamine) and a hydroxyl terminated polyether or polyester in amounts such that the equivalent ratio of amine to hydroxyl groups is from about 80:20 to about 97:3. The second isocyanate component includes an aromatic polyisocyanate or a prepolymer of an aromatic polyisocyanate and a polyisocyanate adduct formed from either toluene diisocyanate or an aliphatic polyisocyanate in amounts such that the ratio of aromatic polyisocyanate to polyisocyanate adduct is in the range of from about 50:50 to about 75:25. Each of these components is combined, preferably in the presence of a solvent in quantities such that the equivalent ratio of isocyanate groups to isocyanate-reactive groups is in the range of from about 1.1 to about 1.0. The components may be reacted at ambient temperature. The coating material formed by this reaction is particularly useful in coating vehicles such as automobiles.

6 Claims, No Drawings

CHIP RESISTANT POLYURETHANE COATING

BACKGROUND OF THE INVENTION

The present invention relates to a chip-resistant, chemical resistant two-component polyurethane coating.

Polyurethane coatings are known and used in many applications. One of the known uses is as a coating on an automobile. However, the commercially available coatings are prone to chipping and may be adversely affected by chemicals. Further, none of the known coatings may be subjected to a decontamination treatment of the type performed on vehicles being transported internationally without significant deterioration of the coating properties.

A polyurethane coating which is chip resistant, resistant to harsh chemicals, and capable of withstanding decontamination treatments would therefore be a valuable addition to the coatings art.

SUMMARY OF THE INVENTION

It is an object of the present invention to provide a chip-resistant, chemical resistant two-component polyurethane coating.

It is also an object of the present invention to provide a polyurethane coating which is capable of withstanding chemical decontamination treatments without significant deterioration of the coating properties.

It is a further object of the present invention to provide a fast curing polyurethane coating which may be applied by spraying, casting, by adhering castable films by casting reaction injection molding (RIM) or resin transfer molding (RTM).

It is another object of the present invention to provide a coating which is formed from components having low volatile organic components.

These and other objects which will be apparent to those skilled in the art are accomplished by reacting a first component made up of isocyanate-reactive materials with a second isocyanate component. The first component is made up of 1) an aromatic polyamine and 2) a hydroxyl group terminated material selected from polyether polyols and saturated polyesters. The second component is made up 3) an aromatic polyisocyanate and 4) a polyfunctional polyisocyanate adduct. The polyisocyanate adduct 4) is formed from either a polyfunctional aliphatic polyisocyanate or toluene diisocyanate. In the first component, the polyamine and hydroxyl group terminated material are used in quantities such the equivalent ratio of amine to hydroxyl groups is within the range of from about 80:20 to about 97:3. In the second component, the aromatic polyisocyanate and the polyisocyanate adduct are used in quantities such that the equivalent ratio of polyisocyanate 3) to polyisocyanate adduct 4) is within the range of from about 50:50 to about 75:25. It is preferred that the first and second components be reacted in the presence of an organic solvent such as methyl ethyl ketone.

DETAILED DESCRIPTION OF THE PREFERRED EMBODIMENTS OF THE PRESENT INVENTION

The present invention relates to a two-component polyurethane coating, i.e., a polyurethane coating formed by reacting two components. In the present invention, the first component is composed of isocyanate reactive materials. This first component must include an aromatic polyamine and at least one polyhydroxyl group terminated material selected from polyether polyols and saturated polyesters. The second component is the isocyanate-containing component and is made up of an aromatic polyisocyanate and a polyisocyanate adduct formed from either an aliphatic polyisocyanate or toluene diisocyanate.

A key feature of the present invention is the equivalent ratios of the materials used in each of the components. More specifically, in the first component, the aromatic polyamine and polyhydroxyl material must be used in quantities such that the equivalent ratio of amine to hydroxyl groups is within the range of from about 80:20 to about 97:3. In the second component, the polyisocyanate 3) and the polyisocyanate adduct 4) must be used in quantities such that the equivalent ratio of 3) to 4) is within the range of about 50:50 to about 75:25. These two components are preferably reacted in the presence of an organic solvent at ambient temperature.

Any of the known aromatic polyamines, preferably diamines may be used in the first isocyanate-reactive component from which the coating of the present invention may be formed. An examples of a suitable diamine is diethylene toluene diamine.

Any of the known polyether polyols having an OH functionality of at least 2, preferably 3 and a molecular weight of at least 1120, preferably from about 650 to about 1800 may be used as the hydroxyl group terminated material in the first isocyanate-reactive component. Suitable polyethers include those formed by reacting a material containing reactive hydrogen atoms with an alkylene oxide such as ethylene oxide, propylene oxide, butylene oxide, styrene oxide, tetrahydrofuran, epichlorohydrin or a combination of these alkylene oxides. Materials having reactive hydrogen atoms which may be reacted with such alkylene oxides include: ethylene glycol, propylene glycol, butanediol, water, methanol, ethanol, hexanetriol, pentaerythritol, mannitol, sorbitol, ethylene diamine, diethylene triamine, ethanolamine, diethanolamine, triethanolamine. Particularly preferred polyether polyols are those formed from triethanolamine and propylene oxide.

Any of the known saturated polyester polyols having an OH functionality of at least 3, preferably from about 3 to about 13 and a equivalent weight of at least 200, preferably from about 215 about 800 may also be used as the hydroxyl group terminated material of the isocyanate-reactive component. Suitable polyester polyols include those made by reacting polyhydric, preferably dihydric alcohols with polybasic, preferably dibasic carboxylic acids or their corresponding anhydrides. Examples of suitable polyhydric alcohols include ethylene glycol, propylene glycol, butanediol, hexanediol, octanediol, neopentyl glycol, diethylene glycol, 2-methyl-1,3-propylene glycol, glycerol and trimethylolpropane. Examples of suitable polybasic acids and their corresponding anhydrides include: succinic acid, adipic acid, suberic acid, azelaic acid, sebacic acid, phthalic acid, isophthalic acid, trimellitic acid, phthalic acid anhydride, tetrahydrophthalic acid anhydride, hexahydrophthalic acid anhydride, tetrachlorophthalic acid anhydride, endomethylene tetrahydrophthalic acid anhydride, glutaric acid anhydride, maleic acid, maleic acid anhydride and fumaric acid.

Any of the known aromatic polyisocyanates and isocyanate group terminated prepolymers formed from such aromatic polyisocyanates may be used as polyisocyanate 3) in the second component from which the coating of the present invention is formed. Specific examples of suitable aromatic polyisocyanates include: toluene diisocyanate, diphenylmethane diisocyanate and NCO terminated prepolymers thereof.

Any of the known polyisocyanate adducts formed from aliphatic isocyanates or toluene diisocyanate may be used as the polyisocyanate adduct 4) of component 2. These polyisocyanate adducts may be prepared from monomeric polyisocyanates, preferably diisocyanates and generally contain biuret, allophanate, urea, urethane, carbodiimide groups or isocyanurate rings. Suitable isocyanates and methods for preparing the polyisocyanate adducts are set forth in U.S. Pat. No. 4,439,593 which is herein incorporated by reference.

Preferred polyisocyanate adducts include the biuret group-containing polyisocyanates based on 1,6-diisocyanatohexane and polyisocyanate adducts containing isocyanurate groups and based on 2,4-diisocyanatotoluene and/or 2,6-diisocyanatotoluene, 1,6-diisocyanatohexane, isophorone diisocyanate and mixtures of these diisocyanates. Also preferred are polyisocyanate adducts containing urethane groups and based on trimethylol propane and 2,4-diisocyanatotoluene and/or 2,6-diisocyanatotoluene, 1,6-diisocyanatohexane, isophorone diisocyanate and mixtures of these diisocyanates. The most preferred polyisocyanate adducts are the biuret group-containing polyisocyanates based on isophorone diisocyanate, polyisocyanate adducts containing isocyanurate and based on isophorone diisocyanate and polyisocyanate adducts containing urethane groups based on trimethylolpropane and isophorone diisocyanate.

In addition to the above-described required materials, the coatings of the present invention may also be made by reacting the first and second components in the presence of organic solvents, catalysts, pigments, dyes, levelling agents and the like which are well known and commonly used in polyurethane chemistry. Such optional materials may be added to either of the individual components from which the coating is formed (preferably to the first component containing isocyanate-reactive materials) or to the reaction mixture formed upon combination of the isocyanate-reactive and isocyanate components.

The coatings of the present invention are made with less solvent than many of those known in the art to achieve a suitable processing viscosity, especially when used in spray applications. Suitable solvents include: toluene, xylene, butylacetate, ethylacetate, ethylene glycol monoethyl ether acetate, ethylene glycol monomethyl ether acetate, ethylene glycol monobutyl ether acetate, ethylene glycol monohexyl ether acetate, propylene glycol monomethyl ether acetate, diethylene glycol monoethyl ether acetate, methyl ethyl ketone, methyl isobutyl ketone, methyl amyl ketone, hexane, heptane and mixtures thereof.

Suitable polyurethane catalysts include tertiary amines, quaternary ammonium hydroxides and organic tin compounds.

The reaction by which the coating is made may be carried out at ambient temperature under atmospheric conditions.

The individual components from which the coating is formed should not be combined until it is time to apply the coating composition to a suitable substrate. Once these components are combined, the mixture of the coreactants has limited useful potlife. The potlife, will, of course, depend upon the reactivity of the specific materials, ratios of materials and if used, catalyst present. When the components are to be combined and reacted, either component may be added to the reaction vessel first or the components may be added simultaneously. It is preferred, however, that the components are mixed via plural methods. These components are combined in amounts such that the ratio of equivalents of isocyanate reactive groups in the first component to the equivalents of isocyanate groups present in the second component is from about 0.8 to about 1.5, preferably from about 1.1 to about 1.3.

The coatings of the present invention may be applied by any of the known, conventional methods such as immersion or spraying to any substrate, also, by adhering castable films by casting RIM and RTM. Metal substrates which have been primed are, however, particularly preferred. These coatings may be used as a topcoat but are preferably used as an intermediate coating which is subsequently coated with a finish coating. The finish coating is preferably a polyurethane coating. Any of the known polyurethane finish coats may be applied to the coating of the present invention.

The coatings of the present invention may be applied in any thickness but the best protection is obtained with a coating 9-12 mils thick. The most preferred thickness will depend upon whether a top coating will be applied to the coating of the present invention. If the coating of the present invention will not be further coated, a thickness of at least 5.0 mils is preferred.

The coatings of the present invention are particularly useful as underbody sealants for vehicles but may be used in any other known coating application.

The coatings of the present invention are elastomeric, have good chemical and corrosion resistance, good light stability properties and are resistant to chipping. These properties are retained even when the coating is exposed to a wide range of temperatures.

Having thus described our invention in detail, the following Examples are given as being illustrative thereof. All parts and percentages given in these Examples are parts by weight and percentages by weight, unless otherwise indicated.

EXAMPLES

The following starting materials were used in the Examples which follow:

AMINE: diethylene toluene diamine.

POLYOL A: a polyether polyol having a functionality of 3, a molecular weight of 1122 which is prepared by propoxylation of triethylene diamine which is commercially available from Miles, Inc. under the name Multranol 9144.

POLYOL B: a polyester polyol present as a 65% solids solution in propylene glycol monomethyl ether acetate, having an equivalent weight of about 215, an OH number of about 260 and a functionality of about 12-12.5, and prepared from trimethylol propane and phthalic acid anhydride.

MEK: methyl ethyl ketone.

POLYISOCYANATE A: an isocyanate (NCO) terminated prepolymer of toluene diisocyanate having an NCO content of 3.5% which is commercially available from Miles, Inc. under the name Desmodur E-14.

POLYISOCYANATE ADDUCT 1: a urethane group-containing polyisocyanate prepared from toluene diisocyanate and trimethylol propane which is commercially available from Miles, Inc. under the name Mondur CB-75.

POLYISOCYANATE ADDUCT 2: an isocyanurate group-containing polyisocyanate prepared by trimerizing a portion of the isocyanate groups of isophorone diisocyanate having an isocyanate content of 11.5% by weight, a content of monomeric diisocyanate of <0.5%, a viscosity at 23° C. of 1300-2700 and an average isocyanate functionality of about 365.

The materials listed in Table 1 below were used in the indicated amounts to form either Component I or Component II as indicated for three different systems. Component I and Component II for each of these systems were combined in the presence of the indicated amount of MEK at ambient temperature. Some of each of the resultant mixtures was then applied to a metal substrate.

TABLE 1-continued

| Component | MATERIALS | Grams Used | Equivalent Ratio (Parts) |
|---|---|---|---|
| I | Polyisocyanate A | 30.31 | 60 |
|  | Amine | 3.00 | 90 |
|  | Polyol B | 1.25 | 10 |
|  | MEK | 10.00 | — |
| II | Polyisocyanate Adduct 2 | 6.15 | 40 |
|  | Polyisocyanate A | 30.31 | 60 |
| I | Amine | 3.00 | 90 |
|  | Polyol A | 1.43 | 10 |
|  | MEK | 10.00 | — |
| II | Polyisocyanate Adduct 2 | 6.15 | 40 |
|  | Polyisocyanate A | 30.31 | 60 |

TABLE 2

| | INSTROM EVALUATION | | | | | GRAVEL-OMETER | | | | |
|---|---|---|---|---|---|---|---|---|---|---|
| | (No. DS2[1] Immersion) | | (1 hr DS2[1] Immersion) | | Percent[4] | Elastomer | Elastomer | Coating | Total | GM[5] |
| System | PSI[2] | % Elongation | PSI[2] | % Elongation[3] | Swell | Film | Thickness | Thickness | Thickness | Rating |
| A | 2588 | 275 | 1513 | 267 | 9.67 | Clear | 3.8 | — | — | −7 |
|  |  |  |  |  |  | Clear | 4.7 | — | — | 9 |
|  |  |  |  |  |  | W/TC | 2.6 | 2.5 | 5.1 | 8 |
|  |  |  |  |  |  | W/TC | 6.8 | 3.6 | 10.4 | 9 |
| B | 1465 | 233 | 1154 | 250 | 19.85 | Clear | 1.8 | — | — | −7 |
|  |  |  |  |  |  | Clear | 6.0 | — | — | 9 |
|  |  |  |  |  |  | W/TC | 1.7 | 2.9 | 4.6 | −7 |
|  |  |  |  |  |  | W/TC | 5.6 | 3.3 | 8.9 | 9 |
| C | 1897 | 308 | 1557 | 342 | 9.67 | Clear | 2.5 | — | — | +6 |
|  |  |  |  |  |  | Clear | 5.4 | — | — | 9 |
|  |  |  |  |  |  | W/TC | 2.0 | 4.5 | 6.5 | +7 |
|  |  |  |  |  |  | W/TC | 6.4 | 3.4 | 9.8 | 9 |
|  |  |  |  |  |  | Pigmented | 2.3 | — | — | −6 |
|  |  |  |  |  |  | Pigmented | 15.1 | — | — | 9 |
|  |  |  |  |  |  | Pig & TC | 3.0 | — | — | +7 |
|  |  |  |  |  |  | Pig & TC | 12.3 | 3.1 | 15.4 | No Defects |

[1]Decontaminating solution made in accordance with Military Specification MIL-D-50030F
[2]Elastomeric tensile strength in pounds per square inch determined in accordance with ASTM D 412-87
[3]Percent elongation determined in accordance with ASTM D 412-87
[4]Percent volume swell after sample is immersed in decontaminating solution by footnote 1 for two hours.
[5]Chip resistance rating according to General Motors Engineering Standard GM9508P. Ratings given on a scale of 0 to 9 with 0 being severely chipped and 9 representing outstanding chip resistance.

The thickness of the coating on a given substrate is indicated in Table 2. The elastomeric coating formed from each of these systems was then evaluated. The results of these evaluations are given in Table 2 below.

Substrates coated with each of Systems A, B and C were also evaluated for rust resistance in accordance with ASTM B 117-85. All panels were left in the salt fog for 1000 hours. The results of these evaluations are summarized in Table 3.

TABLE 3

| | Primed Substrate (MIL-P-50322) | Total Hours Exposed | Exposure Hours Before First Defect | Rust Grade Number | Percent Rust | Comments |
|---|---|---|---|---|---|---|
| System A | None | 1000 | >400 | 3 | 33.0 | Five blisters along with surface rust in center and edge of panel. No adhesion problems. |
| System A | Yes | 1000 | No defects | 10 | 0.01 | No defects observed. |
| System B | None | 1000 | Approx 400 | 4 | 10.0 | Surface rusting appeared under elastomer, in the center of the panel, after 700 hours. Some rusting at the edges after 400 hours. No adhesion problems. |
| System B | Yes | 1000 | No Defects | 10 | 0.01 | No defects observed. |
| System C | None | 1000 | >400 | 5 | 3.0 | Some blistering along edges. Adhesion remained very good. |
| System C | Yes | 1000 | No Defects | 10 | 0.01 | No defects observed. |

TABLE 1

| Component | MATERIALS | Grams Used | Equivalent Ratio (Parts) |
|---|---|---|---|
| I | Amine | 3.00 | 90 |
|  | Polyol A | 1.43 | 10 |
|  | MEK | 10.00 | — |
| II | Polyisocyanate Adduct 1 | 5.44 | 40 |

Substrates coated with each of Systems A, B and C at thicknesses greater than those reported in Table 2 were also evaluated for Chip Resistance in accordance with General Motors Engineering Standard GM 9508P. The results of this evaluation are summarized below in Table 4.

TABLE 4

| System | Film Type | Elastomer Thickness | GM Rating[5] Ambient | Elastomer Thickness | GM Rating[5] −20° C. |
|---|---|---|---|---|---|
| A | Clear | 11.4 mils | No Defect | 12.3 mils | 9 |
|   | W/TC | 12.3 mils | 9 | 12.3 mils | No Defect |
| B | Clear | 10.1 mils | 9 | 13.6 mils | No Defect |
|   | W/TC | 12.5 mils | 9 | 12.4 mils | No Defect |
| C | Clear | 12.9 mils | No Defect | 12.7 mils | No Defect |
|   | W/TC | 16.1 mils | 9 | 12.7 mils | 9 |

Clear = Clear elastomer films
W/TC = Clear elastomer films with a CARC top coat
[5]Chip resistance rating according to General Motors Engineering Standard GM9508P. Ratings given on a scale of 0 to 9 with 0 being severely chipped and 9 representing outstanding chip resistance.

It can be seen from the data presented above that the coatings made with each of Systems A, B and C have very good physical and chemical properties.

Although the invention has been described in detail in the foregoing for the purpose of illustration, it is to be understood that such detail is solely for that purpose and that variations can be made by therein by those skilled in the art without departing from the spirit and scope of the invention except as it may be limited by the claims.

What is claimed is:

1. An elastomeric polyurethane coating which is resistant to chipping and chemicals which is the reaction product of
   a) a first component which includes
      1) an aromatic polyamine and
      2) a hydroxyl terminated polyether polyol or a hydroxyl terminated saturated polyester in amounts such that the equivalent ratio is from about 80 to about 97 parts polyamine 1) and from about 3 parts to about 20 parts of hydroxyl terminated polyether or polyester 2) with the sum of the parts of 1) plus 2) equal to approximately 100 parts; and
   b) a second component which includes
      3) an aromatic polyisocyanate and
      4) a polyfunctional polyisocyanate adduct which is selected from the group consisting of polyfunctional aliphatic polyisocyanates and toluene diisocyanate-based aromatic polyisocyanate adducts in amounts such that the equivalent ratio is from about 50 to about 75 parts of polyisocyanate 3) and from about 25 to about 50 parts of polyisocyanate 4) with the sum of the parts of 3) plus 4) equal to approximately 100 parts.

2. The coating of claim 1 in which an aromatic diamine is included as 1) and a hydroxyl terminated polyether polyol is included as 2).

3. The coating of claim 2 in which a polyfunctional aliphatic polyisocyanate adduct is included as 4).

4. The coating of claim 3 in which the polyfunctional aliphatic polyisocyanate adduct is based upon isophorone diisocyanate.

5. The coating of claim 1 in which an aromatic diamine is included as 1), a hydroxyl terminated polyether polyol is included as 2) and an isophorone diisocyanate adduct is included as 4).

6. The coating of claim 5 in which the ratio of 1) to 2) is about 90:10 and the ratio of 3) to 4) is about 60:40.

* * * * *